US012299152B2

(12) United States Patent
Teichman et al.

(10) Patent No.: US 12,299,152 B2
(45) Date of Patent: May 13, 2025

(54) COHORT BASED RESILIENCY MODELING

(71) Applicant: INTERNATIONAL BUSINESS MACHINES CORPORATION, Armonk, NY (US)

(72) Inventors: Dore Isadore Teichman, Lake Worth, FL (US); Matthew E. Broomhall, Goffstown, NH (US); Philip Richard Evangelista, Liverpool, NY (US); Kelly Grant Lee, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 17/406,666

(22) Filed: Aug. 19, 2021

(65) Prior Publication Data
US 2023/0056422 A1 Feb. 23, 2023

(51) Int. Cl.
*G06F 21/00* (2013.01)
*G06F 16/2458* (2019.01)
*G06F 21/62* (2013.01)
*G06Q 10/0639* (2023.01)

(52) U.S. Cl.
CPC ...... *G06F 21/6218* (2013.01); *G06F 16/2465* (2019.01); *G06Q 10/0639* (2013.01)

(58) Field of Classification Search
CPC ............ G06F 21/6218; G06F 16/2465; G06Q 10/0639
See application file for complete search history.

(56) References Cited

U.S. PATENT DOCUMENTS

| 7,974,815 | B2 | 7/2011 | Blemel | |
|---|---|---|---|---|
| 10,860,451 | B1 * | 12/2020 | Murthy | G06F 17/40 |
| 11,200,494 | B1 * | 12/2021 | Kim | G06N 3/045 |
| 2018/0308002 | A1 * | 10/2018 | Kurian | G06F 11/00 |
| 2019/0353502 | A1 | 11/2019 | Doshi et al. | |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Joseph P Hirl
*Assistant Examiner* — Chi D Nguy
(74) *Attorney, Agent, or Firm* — Aaron Pontikos; Andrew D. Wright; Calderon Safran & Wright P.C.

(57) ABSTRACT

A method including: storing, by a computing device, obfuscated metadata from a plurality of interconnected computing environments into respective data puddles; identifying, by the computing device, a behavior of a first computing environment of the plurality of interconnected computing environments; determining, by the computing device, an expected future performance issue associated with a second computing environment of the plurality of interconnected computing environments based on the identified behavior of the first computing environment; identifying, by the computing device, a locus of the expected future performance issue associated with the second computing environment based on the identified behavior of the first computing environment; and outputting, by the computing device and to an operator of the second computing environment, an impact notification and remedial steps being taken to prevent the expected future performance issue.

25 Claims, 10 Drawing Sheets

(56) References Cited

U.S. PATENT DOCUMENTS

| | | |
|---|---|---|
| 2019/0392924 A1 | 12/2019 | Bettencourt-Silva et al. |
| 2021/0089921 A1 | 3/2021 | Aghdasi et al. |
| 2021/0144026 A1* | 5/2021 | Stein .................... G06F 21/554 |
| 2022/0021593 A1* | 1/2022 | Varnavas .............. G06F 18/211 |
| 2022/0383151 A1* | 12/2022 | Zeng .................... H04M 15/58 |

OTHER PUBLICATIONS

Shah, "Network Aware Resource Scheduling in Sensor Cloud", Journal of Theoretical and Applied Information Technology, vol. 95. No. 2, Jan. 31, 2017, 12 pages.

Okpala, "Interconnectedness in Health and Health Care", Journal of Applied Medical Sciences, vol. 3, No. 1, 2014, 6 pages.

Chutel et al., "Cloud Based Healthcare System", 2018 IJNRD | vol. 3, Issue 1, Jan. 1, 2018, 2 pages.

Palfrey et al., "Interop—The Promise and Perils of Highly Interconnected Systems", 2017, 19 pages.

Anonymously, "Applying Machine Learning Techniques to Determine Product Risks", IP.com, IPCOM000256883D, Jan. 7, 2019, 29 pages.

Shankar et al., "Transfer Inference Learning", https://www.tdcommons.org/dpubs_series/1618, Oct. 30, 2018, 10 pages.

Anonymously, "A Cognitive System to Assess as Soon as Possible Security Exposures in a Customer Environment", IP.com, IPCOM000249244D, Feb. 14, 2017, 6 pages.

Anonymous, "Expert System", https://www.pcmag.com/encyclopedia/term/expert-system, accessed Aug. 19, 2021, 2 pages.

\* cited by examiner

COHORT BASED RESILIENCY MODELING

BACKGROUND

Aspects of the present invention relate generally to computer system and/or application health and performance and, more particularly, to allowing the sharing of system and/or application health and performance data between entities.

Health and performance monitoring in the digital exchange age is experiencing a transition into a much more complex state. With the increase in digital information and transaction exchanges between corporate entities, identifying issues impacting the technical health of a business ecosystem has become increasingly difficult due to the lack of visibility of information outside of organizational boundaries. A basic example of this is connecting Company A to Company B in a supply chain environment. When a problem manifests itself on Company A's system, the impacts can be seen on Company B. In addition, Company B could also be connected to Company C. If company C develops a problem within the connected environment, this could propagate to Company A causing an application stability problem that could then impact Company B. The interconnected ecosystem results can be significant. In addition, entities are highly resistant to sharing data related to their systems of record and practices used to manage and maintain these.

As information technology (IT) functions seek more insightful and more timely root cause analysis, that very analysis becomes increasingly more elusive. Problem solving technicians consistently operate without information that could be helpful as visibility is lost across corporate, and sometimes even business unit, boundaries. Complicating this, many corporate and other entities do not follow best practices. In some cases, personal and sensitive information is manifested in system logs. This then prohibits sharing logs outside of the company due to possible compliance violations such as, for example, Health Insurance Portability and Accountability Act (HIPAA) violations.

As a general rule, no two entities have the same hardware/operating system mix in their IT environments. Different operating systems, system monitors, network systems and management as well as logs and log management, and significant variations in ways in which these can be configured means each organization essentially has their own unique way of gathering, storing and analyzing system/application health and performance data. There is currently no system or method available to address this growing problem. To resolve this growing problem, a single, easily comprehensible view of system/application health and/or performance is needed to allow sharing of system log data related to the health of core applications and core infrastructure hosting these applications across organizational boundaries while still maintaining security and privacy.

SUMMARY

Embodiments of the invention meet the need for a single, easily comprehensible view of system/application health and/or performance to allow sharing of system log data related to the health of core applications and core infrastructure hosting these applications across organizational boundaries while still maintaining security and privacy. Embodiments meet this need by sharing system log data between members of a cohort without exposing the identity of the members or confidential data of the members. Embodiments compare and analyze the log data from different systems, applications, and/or members to identify similarities in problems or issues that are helpful in diagnosing a current issue or anticipating a future issue. In embodiments, a prior problem or issue with a first program on a first system is recognized as having similar aspects to a current problem or issue with a different program running on the same or a different system. In embodiments, a first program on a first system is recognized as having similar aspects to a current program running on the same or a different system and an expected future performance issue is identified based on these similarities.

In a first aspect of the invention, there is a computer-implemented method including: storing, by a computing device, obfuscated metadata from a plurality of interconnected computing environments into respective data puddles; identifying, by the computing device, a behavior of a first computing environment of the plurality of interconnected computing environments; determining, by the computing device, an expected future performance issue associated with a second computing environment of the plurality of interconnected computing environments based on the identified behavior of the first computing environment; identifying, by the computing device, a locus of the expected future performance issue associated with the second computing environment based on the identified behavior of the first computing environment; and outputting, by the computing device and to an operator of the second computing environment, an impact notification and remedial steps being taken to prevent the expected future performance issue. This aspect provides the advantage of predicting a future problem with a computing environment based on a problem previously seen in a different computing environment.

In embodiments, the identifying the behavior of the first computing environment is based on analyzing a first data puddle of the data puddles, the first data puddle being associated with the first computing environment.

In another aspect of the invention, there is a computer-implemented method including: storing, by a computing device, obfuscated metadata from a plurality of interconnected computing environments into respective data puddles; identifying, by the computing device, a pattern of a first computing environment of the plurality of interconnected computing environments; determining, by the computing device, an expected future performance issue associated with a second computing environment of the plurality of interconnected computing environments based on the identified pattern of the first computing environment; identifying, by the computing device, a locus of the expected future performance issue associated with the second computing environment based on the identified pattern of the first computing environment; and outputting, by the computing device and to an operator of the second computing environment, an impact notification and remedial steps being taken to prevent the expected future performance issue. This aspect provides the advantage of predicting a future problem with a computing environment based on a problem previously seen in a different computing environment.

Embodiments include pairing, by the computing device, one or more problem management reports to the identified locus of the expected future performance issue based on a confidence score associated with a problem management report being above a predetermined threshold. This aspect provides the advantage of limiting the pairing to only those pairings that have at least a predetermined confidence level.

In another aspect of the invention, there is a computer-implemented method including: storing, by a computing device, obfuscated metadata from a plurality of interconnected computing environments into respective data puddles; identifying, by the computing device, a behavior of a first computing environment of the plurality of interconnected computing environments; determining, by the computing device, a current performance issue associated with a second computing environment of the plurality of interconnected computing environments based on the identified behavior of the first computing environment; identifying, by the computing device, a locus of the current performance issue associated with the second computing environment based on the identified behavior of the first computing environment; and outputting, by the computing device and to an operator of the second computing environment, an impact notification and remedial steps being taken to remediate the current performance issue. This aspect provides the advantage of identifying the cause of a current problem with a computing environment based on a problem previously seen in a different computing environment.

Embodiments include pairing, by the computing device, one or more problem management reports to the identified locus of the current performance issue based on a confidence score associated with a problem management report being above a predetermined threshold. This aspect provides the advantage of limiting the pairing to only those pairings that have at least a predetermined confidence level.

In another aspect of the invention, there is a computer program product including one or more computer readable storage media having program instructions collectively stored on the one or more computer readable storage media. The program instructions are executable to: store obfuscated metadata from a plurality of interconnected computing environments into respective data puddles; identify a behavior of a first computing environment of the plurality of interconnected computing environments; determine an expected future performance issue associated with a second computing environment of the plurality of interconnected computing environments based on the identified behavior of the first computing environment; identify a locus of the expected future performance issue associated with the second computing environment based on the identified behavior of the first computing environment; and output, to an operator of the second computing environment, an impact notification and remedial steps being taken to prevent the expected future performance issue. This aspect provides the advantage of predicting a future problem with a computing environment based on a problem previously seen in a different computing environment.

In embodiments, each of the data puddles is isolated from each of the other of the data puddles. This aspect provides the advantage of preventing confidential data related to one cohort member form being seen by another cohort member.

In another aspect of the invention, there is a system including a processor, a computer readable memory, one or more computer readable storage media, and program instructions collectively stored on the one or more computer readable storage media. The program instructions are executable to: store obfuscated metadata from a plurality of interconnected computing environments into respective data puddles; identify a behavior of a first computing environment of the plurality of interconnected computing environments; determine an expected future performance issue associated with a second computing environment of the plurality of interconnected computing environments based on the identified behavior of the first computing environment; identify a locus of the expected future performance issue associated with the second computing environment based on the identified behavior of the first computing environment; and output, to an operator of the second computing environment, an impact notification and remedial steps being taken to prevent the expected future performance issue. This aspect provides the advantage of predicting a future problem with a computing environment based on a problem previously seen in a different computing environment.

In embodiments, the expected future performance issue is associated with a computer application running in the second computing environment and the identified behavior of the first computing environment is associated with a computer application running in the first computing environment, the first computer application and the second computer application being different computer applications.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
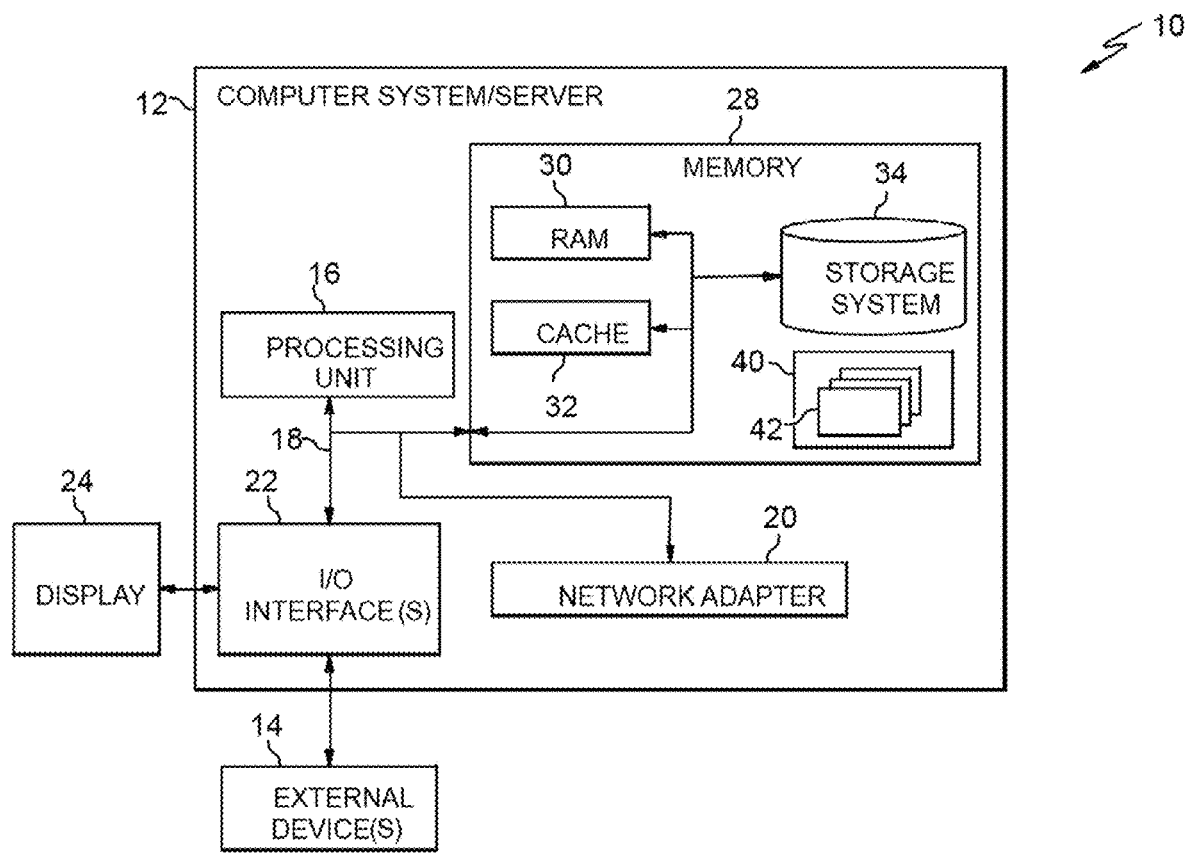
FIG. 1 depicts a cloud computing node according to an embodiment of the present invention.

Aspects of the present invention relate generally to computer system and/or application health and performance and, more particularly, to allowing the sharing of system and/or application health and performance data between entities. According to aspects of the invention a problem identification system predicts a future issue by identifying a similar issue in a separate computer environment. In embodiments, the similar issue is an issue in a different operating system or application. In this manner, implementations of the invention provide the benefit of knowledge related to performance issues experienced in a first computing environment to a second computing environment without disclosing confidential information pertaining to and/or contained in the first computing environment.

A computer-implemented method and system for assessing the health of interconnected computing environments includes: storing obfuscated metadata from a plurality of interconnected computing environments into respective data puddles; identifying application/system behaviors and patterns of a first computing environment of the plurality of interconnected computing environments based on analyzing a data puddle associated with the first computing environment; determining an expected future application/system performance issue associated with a second computing environment of the plurality of interconnected computing environments based on the identified application/system behaviors and patterns of the first computing environment; identifying a locus of the expected future application/system performance issue associated with the second computing environment based on the identified application/system behaviors of the first computing environment; and pairing one or more problem management reports to the identified locus of the application and/or system performance issue based on a confidence score associated with a problem management report being above a predetermined threshold.

Implementations of the invention are improvements to the functioning of a computer. For example, predicting a future performance issue in a second computing environment by identifying a similar issue in a first computing environment improves the functioning of the second computing environment by reducing down time and improving efficiency. Technical features of embodiments include a second portion of an adaptive resilience modeler being an AI application that is trained by an influx of data from varying and often times unrelated sources across all cohorts. This and other technical features solve (and/or provide a technical contribution to solving) the technical problem of determining a solution to a current performance issue or predicting a future performance issue in a computing environment.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
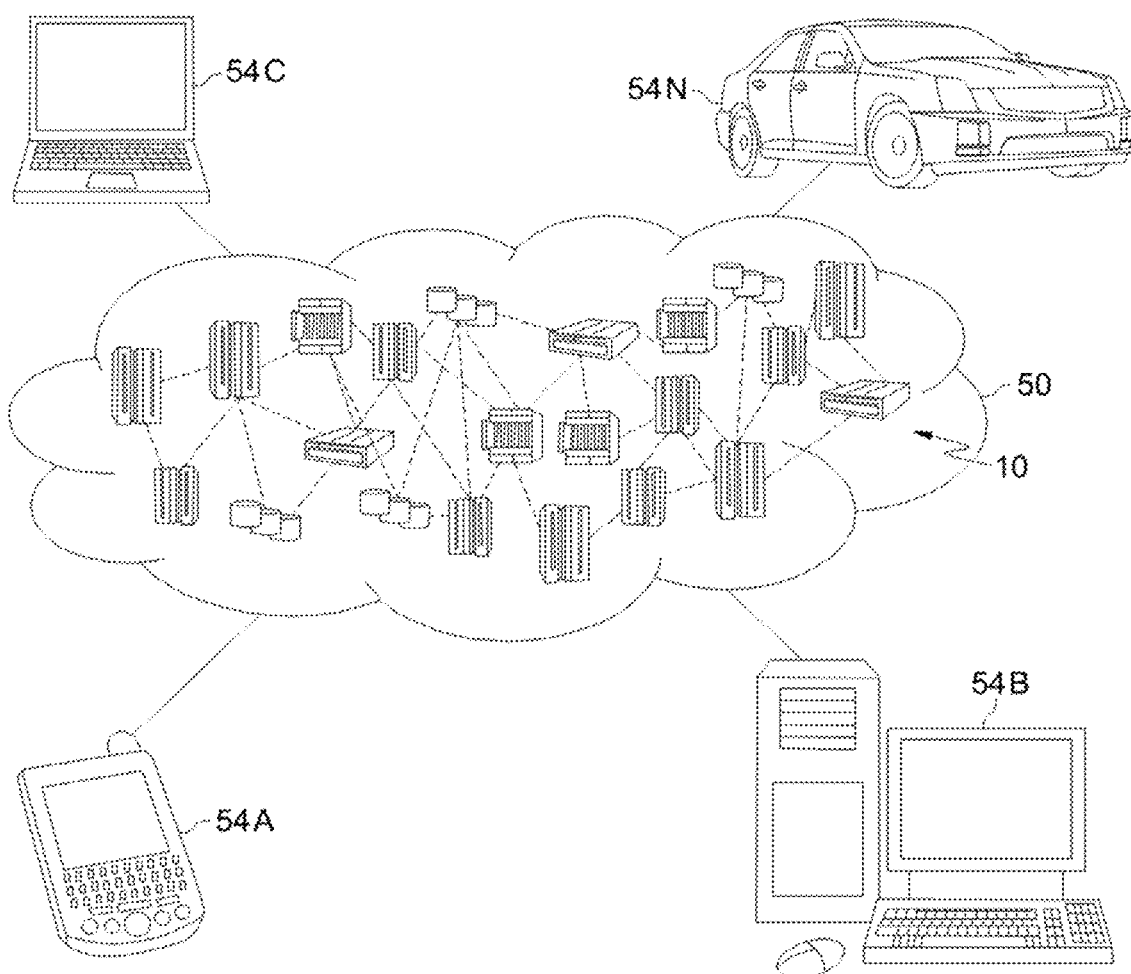
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
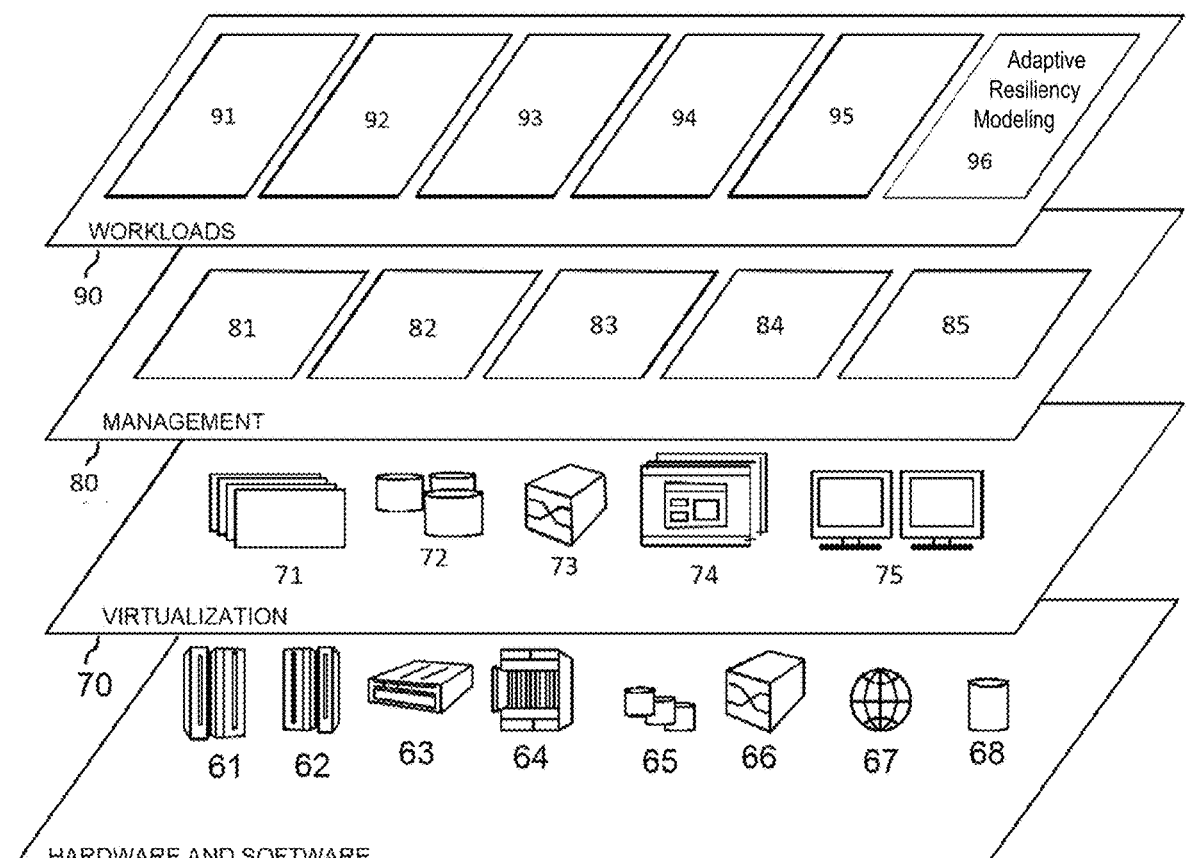
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive resiliency modeling 96.

Implementations of the invention may include a computer system/server 12 of FIG. 1 in which one or more of the program modules 42 are configured to perform (or cause the computer system/server 12 to perform) one or more functions of the adaptive resiliency modeling 96 of FIG. 3. For example, the one or more of the program modules 42 may be configured to: store obfuscated metadata from a plurality of interconnected computing environments into respective data puddles; identify a behavior of a first computing environment of the plurality of interconnected computing environments; determine an expected future performance issue associated with a second computing environment of the plurality of interconnected computing environments based on the identified behavior of the first computing environment; and identify a locus of the expected future performance issue associated with the second computing environment based on the identified behavior of the first computing environment.

In many cases, it is highly unlikely that organizations are willing to permission monitoring across/through organizational boundaries by other organizations. Embodiments of the invention include an opt-in system that can assess likely impacts and likely solutions for members of primary or secondary entity cohort groups that comprise a business ecosystem. Embodiments identify and become "aware" of patterns and anti-patterns across various operating systems and products. Observed patterns and anti-patterns in one product running under one operating system provide insight into the behavior of an entirely different product running under an entirely different operating system. An AI application in accordance with embodiments becomes increasingly good at identifying both expected and undesirable behavior. This is accomplished by using a split AI model that first looks at incoming data and determines relationships in a fluid and often chaotic environment in which an unseen issue may result in a negative impact outside of the organization in which the issue is occurring. In this way, embodiments address cross-organizational boundaries without the cohort members or related cohort members being aware of who each entity is, and without intrusion through their organizational firewall boundaries.

Embodiments keep the entire ecosystem (health management) whole and alive no matter which cohort member within the ecosystem causes a problem. Embodiments accomplish this by: ingesting log data from individual entities; identifying patterns and anti-patterns for the incoming data for each entity; grouping individual entities into related cohorts; and identifying issue/solution pairs within a cohort.

Embodiments include AI systems/applications that are multi-layered neural networks. The term AI application is used herein to represent AI applications and/or AI systems. Embodiments include an end-to-end open source platform for machine learning, for example, including machine learning and model development. An AI application in accordance with embodiments is comprised of two parts, a front-end portion and a second portion. This arrangement provides a means to succeed in understanding the chaotic mix of multiple organizations within a cohort as well as organizations that span multiple cohorts at different levels.

In embodiments, a front-end AI application ingests logs streamed to the system from each cohort entity and identifies patterns, anti-patterns and changes to both as they occur as well as identifies members of cohort groups and changes to cohort groups. The front-end application organizes data/logs into normalized data puddles for each cohort member and uses this initial data and findings to inform the second AI application.

In embodiments, the second portion of the AI application looks for behaviors within and between cohort members to identify the one or more loci of an application and/or system's health and/or performance problems and determine how it is likely to manifest and what the most likely remedies are. Data completeness and issue complexity drive the application's ability to deliver results with high statistical confidence. The application informs the source that their entity is impacting the cohort as well as the steps to remediate. The second portion is informed, by the front-end portion, of trouble ticket data as well as continually learning over time what works within a complex cohort environment. The AI application has a view of the trouble tickets from all vendors included in the operational model. This allows the AI application to augment problem identification accuracy by quickly identify a likely problem against those already known by the trouble ticket data already ingested by the system. In embodiments, a service provider manages the security of all incoming and ingested data.

In embodiments, an organization/entity opts in to using the system. In embodiments, this results in a data puddle being created that will contain system logs and related data from all primary and secondary systems that interact with other outside entities. A data puddle is a depository for data from one entity. In embodiments, the organization identifies, to the system, the data (logs) that will be streamed to the system. In embodiments, once an interlock is established, the data is streamed to the data puddle established for the particular organization. In embodiments, this will also include trouble tickets (current and/or historical) for all products and services related to the data being streamed to the system. In embodiments, organizational information is obfuscated and all sensitive private information is removed by the system (should any exist) as new and updated log data is ingested by the system.

In embodiments, the system does not provide the identities of cohort members to other entities within the cohort in order to maintain operational and business practices privacy. In embodiments, the system ingests all new and updated information contributed by each organization. In embodiments, this includes new and changed logs, changes to log format and system configuration changes. In embodiments, the system reorganizes the structure of the data in the cohort member data puddle based on data and data type changes when they occur.

In embodiments, the system evaluates data contained in each member data puddle. In embodiments, the system also evaluates data for other cohort groups concurrently. In embodiments, as issues and/or emerging issues are identified, the system seeks to enhance confidence in findings by leveraging issues and solutions from all other cohort groups. In embodiments, the system determines source and locus of impact. In embodiments, the system increases accuracy with better data and prior experience. In embodiments, the system pairs solution play books to the issue or issues with relative confidence levels for successful remediation. In embodiments, based on data available, the system delivers recommendations that improve data along with one or more problem/solution pairs to the cohort member that is the source of the issue. In embodiments, these are in the form of probabilistic determinations of issue/solution pairs. In embodiments, the system delivers impact notifications to impacted cohort members and steps being taken to remediate. In this manner, implementations output, to an operator of the second computing environment, an impact notification and steps being taken to remediate the expected future performance issue. In embodiments, the system becomes more experienced over time and will steadily improve confidence and accuracy of problem/solution pairs. As an example, the system's AI component provides the statement: "There is a 75% chance an issue with message transfer between two cohorts is likely to manifest in this ecosystem within 24 hours. Given that, there is 94% chance this is the problem and that there is a 91% chance that these steps or this action plan will address the issues for company X, and a 82% chance these same steps will address the issue for company Y" in a similar cohort.

Embodiments will, over time, generate and assemble metadata beyond the metadata that is present in the data received from the cohort members, establishing a database that becomes increasingly more helpful in solving and predicting problems. Embodiments identify and predict problems based on the logs received from cohort members before one or more of the members realizes that their system contains a problem. This identification and prediction is possible as a result of the increasing large database of potentially problematic programs and interactions. Embodiments successfully identify security vulnerabilities in one member's system based on similar, but not necessarily identical, problems detected in another member's system.

Figure 4:
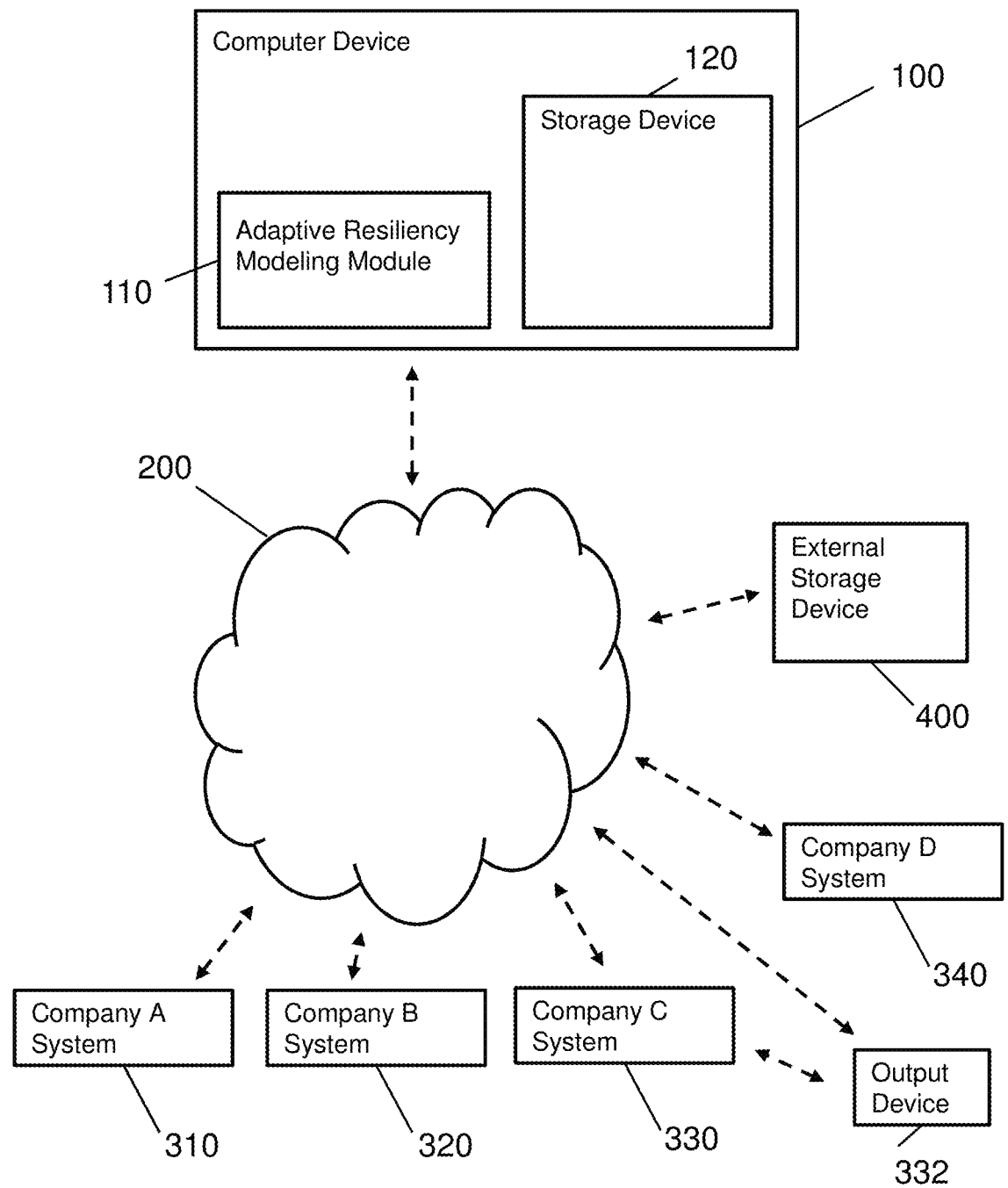
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50 of FIG. 2. In this example, computer device 100 includes an adaptive resiliency modeling module 110, for example, one or more of program modules 42 in FIG. 1, and a storage device 120 such as, for example, storage system 34 in FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 4 shows a company A system 310 such as, for example, a computer system having some or all of the features of computer system/server 12 in FIG. 1, that interacts with adaptive resiliency modeling module 110. Similarly, FIG. 4 shows a company B system 320, a company C system 330, and a company D system 340 such as, for example, computer systems having some or all of the features of computer system/server 12 in FIG. 1, that interact with adaptive resiliency modeling module 110. FIG. 4 also shows an external storage device 400 such as, for example, another computer device having some or all of the features of computer system/server 12 in FIG. 1, that is external to computer device 100 and contains data useful to adaptive resiliency modeling module 110 such as for example, AI experience database 640 shown in FIG. 6. In embodiments, one or more databases, such as for example, database 640 shown in FIG. 6, that are accessed by adaptive resiliency modeling module 110 are stored on storage device 120. In embodiments, databases accessed by adaptive resiliency modeling module 110 are contained in storage device 120 and/or external storage device 400.

FIG. 4 shows an output device 332, such as a monitor or computing device, connected to Company C System 330 and to network 200. In embodiments, an operator of Company C System 330 receives notifications regarding output from adaptive resiliency modeling module 110 through output device 332.

Figure 5:
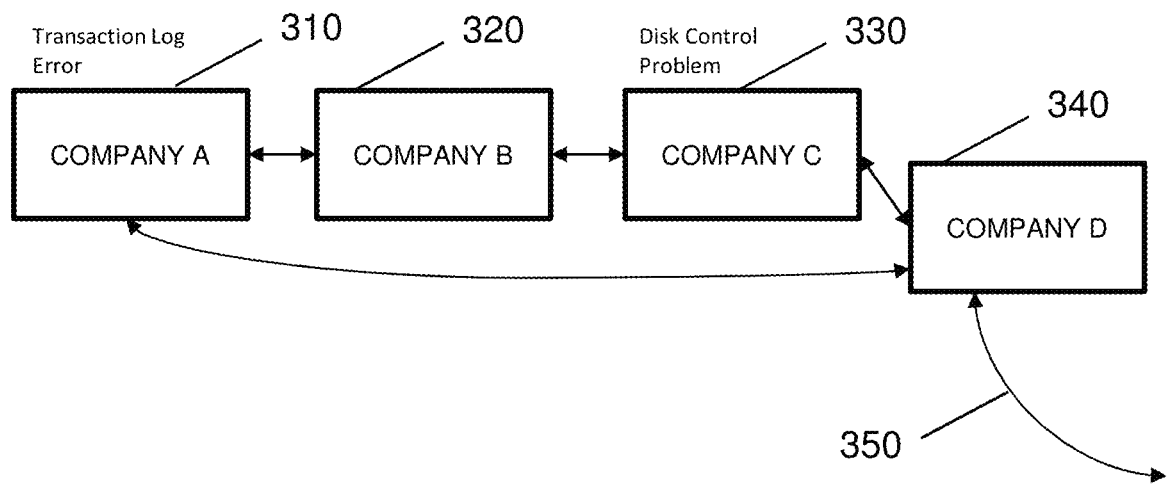
FIG. 5 shows an example of a problem solved by embodiments of the invention.

FIG. 5 shows an example of a problem solved by embodiments of the invention. In this example, company A 310, company B 320, company C 330, and company D 340 all have systems linked to a single computer application. In this example, a transaction proceeds from company A 310 to company B 320 to company C 330 to company D 340 and then to an end user and/or further processing along path 350. An application processing issue at any of the companies (nodes) can manifest itself at any one or all of the other companies. In this example, company A 310 has a transaction log error and company C 330 has a disk control problem. In this example, the disk control problem at company C 330 may or may not be caused by the transaction log error at company A 310. Without visibility across corporate boundaries in a secure manner, identifying the root cause of the disk control problem at company C 330 may prove difficult or even impossible. There is little assurance that the system exhibiting an issue in its log files is actually the system causing the problem, or even a participant in the problem. When company C 330 exhibits a performance problem, embodiments of the invention determine whether company C 330 is the cause of the problem or a casualty of a problem in a different company. The cause can be from within any member of an interrelated cohort group such as, for example, the group containing company A 310, company B 320, company C 330, and company D 340.

Different systems can have different monitors that run efficiently to gather information about the system. These monitors can be manufactured by different companies. In these different monitors, similar sounding terms may have different meanings. Different systems, operating systems, and performance monitors sometimes use different terminology to describe similar things, and sometimes they use the same term but its meaning is vastly different. For example, CPU-BUSY-TIME may mean the busy time in seconds of a single core, thread, or entire processor chip containing up to 24, or even 32, cores. Many such differences in terminology can exist in the plurality of complex computer systems in a given cohort. Embodiments of the invention "normalize" terminology to a single meaning, which improves consistency across both technology boundaries and company boundaries. Embodiments include metadata to convert the data from various performance monitors into a single set of values that are uniform across different systems, operating systems, and performance monitors so that someone looking at the data can properly interpret and compare values.

Conventional devices do not coordinate clocks across both system technology and company boundaries. Coordinating the time stamps in log files to the greatest extent possible improves analysis across disparate systems. For example, "catching" an incident that lasted 200 milliseconds is difficult, if not impossible, when the log file time stamps in different logs are minutes apart. Some log files may contain confidential or sensitive data that is either sensitive to the owning company or legally regulated such as, for example, medical information protected by HIPAA. Placing this data in log files occurs and is preferably properly remediated prior to sharing log files across systems.

Embodiments provide for system log sharing containing permission-based metadata to control access to data. In such embodiments, for each field or column contained in the log files database the supporting metadata allows control over one or more of: entities that are permitted access including type of access permitted and when access is allowed; system resources used to view access; and control of the data dictionary including addition or deletion of shared system log data, and data collection timing and interval. An analysis system in accordance with embodiments of the invention is fully permissioned while still allowing each cooperating entity or cohort member to control access to their data without requiring data to be directly shared between related entities/cohort members. In embodiments, adaptive resiliency modeling module 110 maintains a log of data usage and results for future use by adaptive resiliency modeling module 110. In embodiments, adaptive resiliency modeling module 110 (using, for example, cascading tensor flow models) recognizes and scrubs personalized data from log files (for example, all log files), resulting in obfuscated metadata. In embodiments, adaptive resiliency modeling module 110 encrypts and anonymizes all log data, removing unencrypted data identification, including the source of the data.

Figure 6:
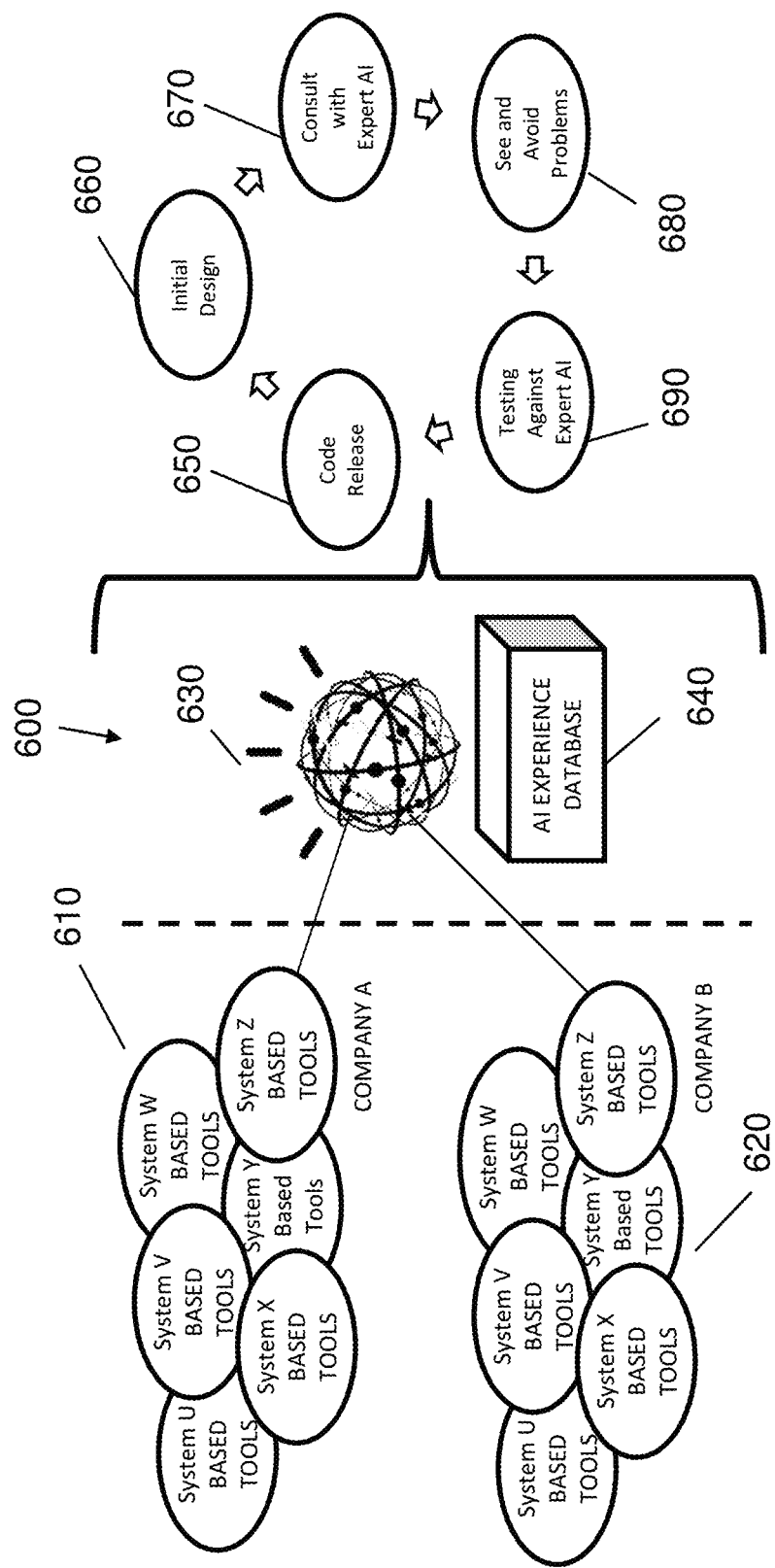
FIG. 6 shows a block diagram of an exemplary environment in accordance with aspects of the invention.

FIG. 6 shows an example of a smart release, design, and implementation phase of a coding or system design in accordance with embodiments of the invention. In FIG. 6, company A 610 and company B 620 each use a plurality of system based tools in their respective computer systems. In this example, a perimeter network 600 includes an adaptive resiliency modeler 630 such as, for example, computer device 100 including adaptive resiliency modeling module 110. In this example, adaptive resiliency modeler 630 accesses an artificial intelligence (AI) experience database 640 located in a storage device such as, for example, storage device 120 and/or external storage device 400. In this example, development and implementation cycles are advised of coding and design pitfalls in the concept and early development phase before they are implemented into production code. The result is higher operational code quality benefiting both vendors and customers. In this example, adaptive resiliency modeler 630 monitors a code release at 650 and through its initial design at 660. In this example, adaptive resiliency modeler 630 consults with an expert AI at 670 (such as AI experience database 640) to see and avoid problems at 680. In this example, adaptive resiliency modeler 630 tests the code during its design against an expert AI (such as AI experience database 640) at 690.

Figure 7:
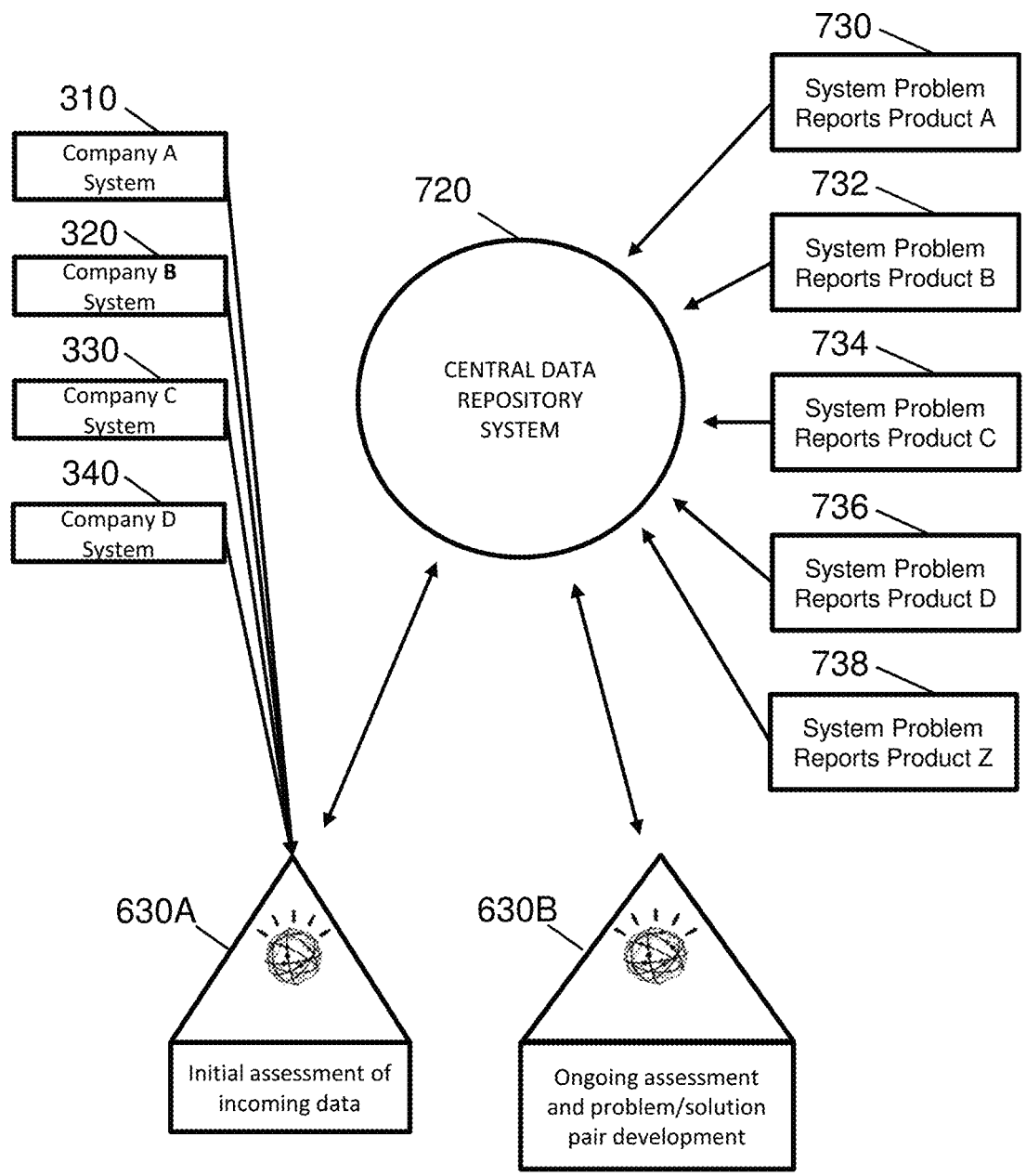
FIG. 7 shows a block diagram of an exemplary environment in accordance with aspects of the invention.

FIG. 7 shows an example of detection of existing problems and resolution of those problems in accordance with embodiments of the invention. In FIG. 7, company A 310, company B 320, company C 330, and company D 340 are linked to, and/or accessed by, a front-end portion 630A of adaptive resiliency modeler 630. In embodiments, company A 310, company B 320, company C 330, and company D 340 transmit logs to front-end portion 630A. In embodiments, front-end portion 630A accesses company A 310, company B 320, company C 330, and company D 340 to retrieve logs. In embodiments, front-end portion 630A scrubs personalized data from the logs as described above to produce the obfuscated metadata. In embodiments, front-end portion 630A retrieves the logs that contain the obfuscated metadata. In this manner, implementations retrieve obfuscated metadata from a plurality of interconnected computing environments. In this example, a central data repository system 720 receives system problem reports for a plurality of products. In FIG. 7, these reports include system problem reports product A 730, system problem reports product B 732, system problem reports product C 734, system problem reports product D 736, and system problem reports product Z 738. Adaptive resiliency modeler 630 uses the system problem reports for the various products when it develops the problem/solution pairings discussed below.

In embodiments, front-end portion 630A performs an initial assessment of incoming data in the form of, for example, performance logs to determine what problems (behavior) the source (for example, company A 310, company B 320, company C 330, or company D 340) of the incoming data has experienced. For example, front-end portion 630A determines that a particular program running on the operating system of company A 310 occasionally misreads a particular register. In this manner, implementations identify a behavior of a first computing environment of the plurality of interconnected computing environments. In embodiments, a second portion 630B of adaptive resiliency modeler 630 performs an ongoing assessment of incoming data and develops problem/solution pairings across data from different sources.

In embodiments, each system of each cohort member (company A 310, company B 320, company C 330, and company D 340) exports its log data to front-end portion 630A. While adaptive resiliency modeler 630 is the central focal point, each cohort member's data is deposited in a custom created data puddle in central data repository system 720. In embodiments, each cohort member also provides known problems and solutions for each system/product used. In embodiments, front-end portion 630A is trained to read entries in central data repository system 720 and problem reports 730, 732, 734, 736, 738 placed in central data repository system 720. In embodiments, this training includes a human technician teaching front-end portion 630A how to recognize data in entries in central data repository system 720 that may correlate to problems in similar or different systems/products. In embodiments, front-end portion 630A uses this training along with patterns and anti-patterns found within the incoming logs as the first pass at identifying problems experienced by individual cohort members. For example, front-end portion 630A identifies a problem experienced by company A 310. In embodiments, the patterns are application patterns of applications running on the systems of the cohort members. In this manner, implementations identify an application pattern of the first computing environment. In embodiments, the patterns are system patterns of the systems of the cohort members. In this manner, implementations identify a system pattern of the first computing environment.

Embodiments perform an analysis across company and architecture boundaries. In embodiments, this analysis is performed by second portion 630B, which is an AI application that is trained by the influx of data from varying and often times unrelated sources across all cohorts. Second portion 630B gains experience and is able to perform inferential analysis based on the whole corpus of its expanding knowledge base. For example, there are a finite number of ways to manage page swapping and memory heap sorting and, regardless of source language or platform, the basic logic of these ways remains the same. This means that a mistake in design or coding can be made in any or all versions of the basic code, regardless of language or platform. Having seen a vast corpus of data, second portion 630B is able to recognize these mistakes without regard to the source language or platform. In embodiments, second portion 630B is an Expert System, an Expert System being an AI application that uses a knowledge base of human expertise for problem solving.

In embodiments, second portion 630B learns from both the problem reports in its databases as well as the actual code as conveyed via logs. For example, second portion 630B recognizes that it has seen a problem before, but that it was on a different machine running different software. In this manner, implementations determine an expected future performance issue (or a current performance issue) associated with a second computing environment of the plurality of interconnected computing environments based on the identified behavior/pattern of a first computing environment. With this information, second portion 630B begins exploring root cause analysis in order to suggest likely problem/ solution pairs. In this manner, implementations identify a locus of the expected future performance issue (or a current performance issue) associated with the second computing environment based on the identified behavior/pattern of the first computing environment. In embodiments, second portion 630B has access to log data from the complete cohort of systems involved in information processing without regard to corporate boundaries. This means that second portion 630B isolates a problem rooted at company A 310 and manifesting itself at company C 330 and determines the root cause. In embodiments, these problem/solutions pairs are used to determine expected future performance issues in different computing environments of the cohort members.

For example, second portion 630B determines an expected future performance issue (or a current performance issue) associated with company C 330 based on an identified behavior of company A 310. As such, the identified behavior of company A 310 is the locus of the of the expected future performance issue (or a current performance issue) at company C 330. In embodiments, second portion 630B pairs one or more problem management reports to the identified locus of the expected future performance issue (or the current performance issue) based on a confidence score associated with a problem management report being above a predetermined threshold. For example, in embodiments, second portion 630B pairs system problem reports product A 730 to the identified locus of the expected future performance issue (or current performance issue) based on a confidence score associated with system problem reports product A 730 being above a predetermined threshold. In this manner, implementations pair one or more problem management reports to the identified locus of the expected future performance issue (or a current performance issue) based on a confidence score associated with a problem management report being above a predetermined threshold.

In embodiments, based on data available, second portion 630B delivers impact notifications to impacted cohort members (for example, company C 330) and steps being taken (for example, at company A 310) to remediate. In this manner, implementations output, to an operator of a second computing environment, an impact notification and remedial steps being taken to prevent the expected future performance issue.

Figure 8:
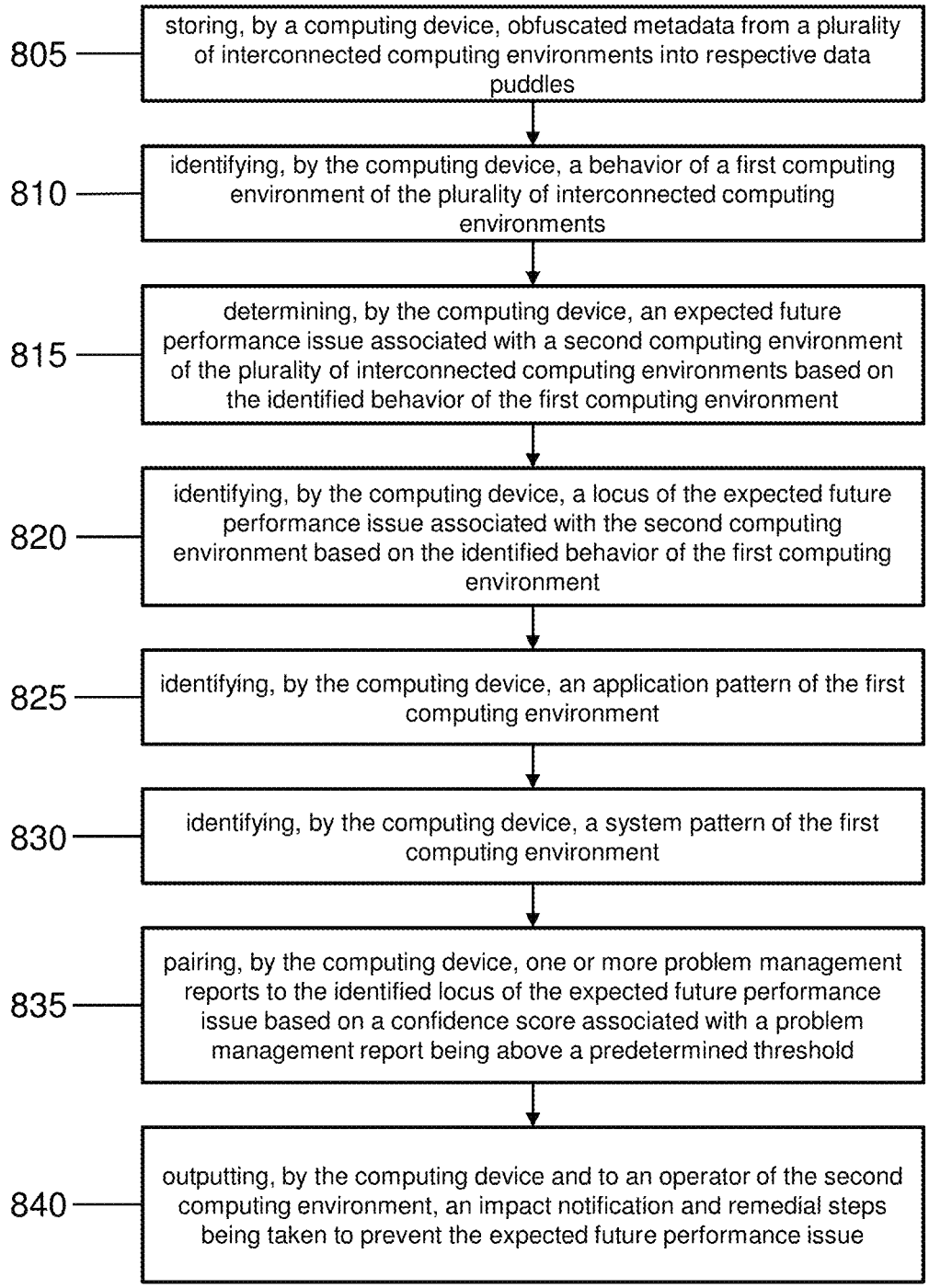
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 4 and are described with reference to elements depicted in FIGS. 4 and 7.

At step 805, the method stores, by a computing device, obfuscated metadata from a plurality of interconnected computing environments into respective data puddles. In embodiments, and as described with respect to FIG. 7, front-end portion 630A of adaptive resiliency modeler 630 stores in central data repository system 720 obfuscated metadata from company A 310, company B 320, company C 330, and company D 340 into respective data puddles.

At step 810, the method identifies, by the computing device, a behavior of a first computing environment of the plurality of interconnected computing environments. In embodiments, and as described with respect to FIG. 7, front-end portion 630A of adaptive resiliency modeler 630 identifies a behavior of company A 310.

At step 815, the method determines, by the computing device, an expected future performance issue associated with a second computing environment of the plurality of interconnected computing environments based on the identified behavior of the first computing environment. In embodiments, and as described with respect to FIG. 7, second portion 630B of adaptive resiliency modeler 630 determines an expected future performance issue associated with company C 330 based on the identified behavior of company A 310.

At step 820, the method identifies, by the computing device, a locus of the expected future performance issue associated with the second computing environment based on the identified behavior of the first computing environment. In embodiments, and as described with respect to FIG. 7, second portion 630B of adaptive resiliency modeler 630 identifies the locus of the expected future performance issue associated with company C 330 as company C 330 based on the identified behavior of company A 310.

At step 825, the method identifies, by the computing device, an application pattern of the first computing environment. In embodiments, and as described with respect to FIG. 7, front-end portion 630A of adaptive resiliency modeler 630 identifies an application pattern of company A 310.

At step 830, the method identifies, by the computing device, a system pattern of the first computing environment. In embodiments, and as described with respect to FIG. 7, front-end portion 630A of adaptive resiliency modeler 630 identifies a system pattern of company A 310.

At step 835, the method pairs one or more problem management reports to the identified locus of the expected future performance issue based on a confidence score associated with a problem management report being above a predetermined threshold. In embodiments, and as described with respect to FIG. 7, second portion 630B of adaptive resiliency modeler 630 pairs system problem reports product A 730 to the identified locus of the expected future performance issue based on a confidence score associated with system problem reports product A 730 being above a predetermined threshold.

At step 840, the method outputs, by the computing device and to an operator of the second computing environment, an impact notification and remedial steps to be taken to prevent the expected future performance issue. In embodiments, and as described with respect to FIG. 7, second portion 630B of adaptive resiliency modeler 630 outputs to company C 330 an impact notification notifying company C 330 of the expected future performance issue, and outputs to company C 330 remedial steps being taken at company A 310 to prevent the expected future performance issue.

Figure 9:
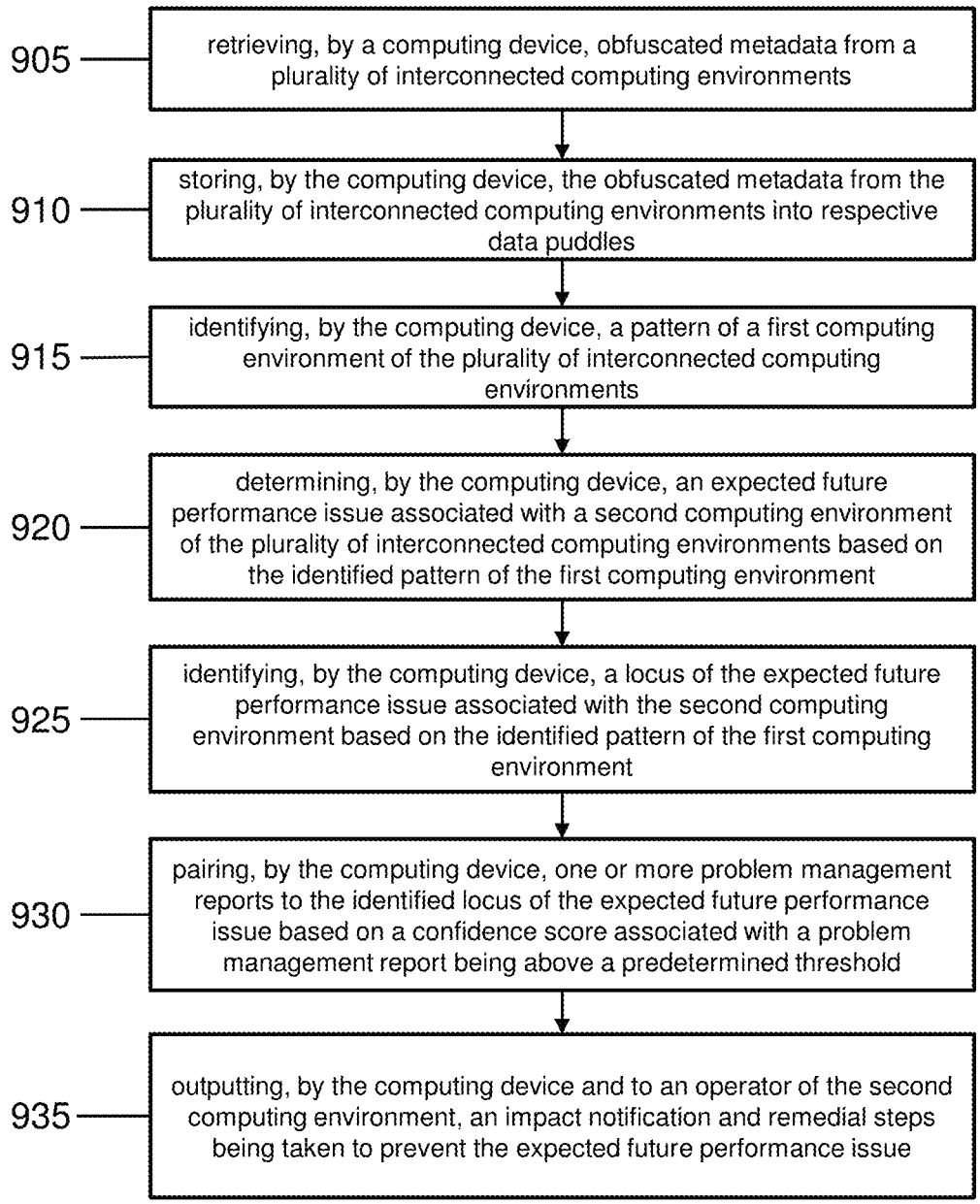
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 4 and are described with reference to elements depicted in FIGS. 4 and 7.

At step 905, the method retrieves, by a computing device, obfuscated metadata from the plurality of interconnected computing environments. In embodiments, and as described with respect to FIG. 7, front-end portion 630A of adaptive resiliency modeler 630 retrieves obfuscated metadata from company A 310, company B 320, company C 330, and company D 340.

At step 910, the method stores, by the computing device, the obfuscated metadata from a plurality of interconnected computing environments into respective data puddles. In embodiments, and as described with respect to FIG. 7, front-end portion 630A of adaptive resiliency modeler 630 stores in central data repository system 720 the obfuscated metadata from company A 310, company B 320, company C 330, and company D 340 into respective data puddles.

At step 915, the method identifies, by the computing device, a pattern of a first computing environment of the plurality of interconnected computing environments. In embodiments, and as described with respect to FIG. 7, front-end portion 630A of adaptive resiliency modeler 630 identifies a pattern of company A 310.

At step 920, the method determines, by the computing device, an expected future performance issue associated with a second computing environment of the plurality of interconnected computing environments based on the identified pattern of the first computing environment. In embodiments, and as described with respect to FIG. 7, second portion 630B of adaptive resiliency modeler 630 determines an expected future performance issue associated with company C 330 based on the identified pattern of company A 310.

At step 925, the method identifies, by the computing device, a locus of the expected future performance issue associated with the second computing environment based on the identified pattern of the first computing environment. In embodiments, and as described with respect to FIG. 7, second portion 630B of adaptive resiliency modeler 630 identifies the locus of the expected future performance issue associated with company C 330 as company C 330 based on the identified pattern of company A 310.

At step 930, the method pairs one or more problem management reports to the identified locus of the expected future performance issue based on a confidence score associated with a problem management report being above a predetermined threshold. In embodiments, and as described with respect to FIG. 7, second portion 630B of adaptive resiliency modeler 630 pairs system problem reports product A 730 to the identified locus of the expected future performance issue based on a confidence score associated with system problem reports product A 730 being above a predetermined threshold.

At step 935, the method outputs, by the computing device and to an operator of the second computing environment, an impact notification and remedial steps to be taken to prevent the expected future performance issue. In embodiments, and as described with respect to FIG. 7, second portion 630B of adaptive resiliency modeler 630 outputs to company C 330 an impact notification notifying company C 330 of the expected future performance issue, and outputs to company C 330 remedial steps being taken at company A 310 to prevent the expected future performance issue.

Figure 10:
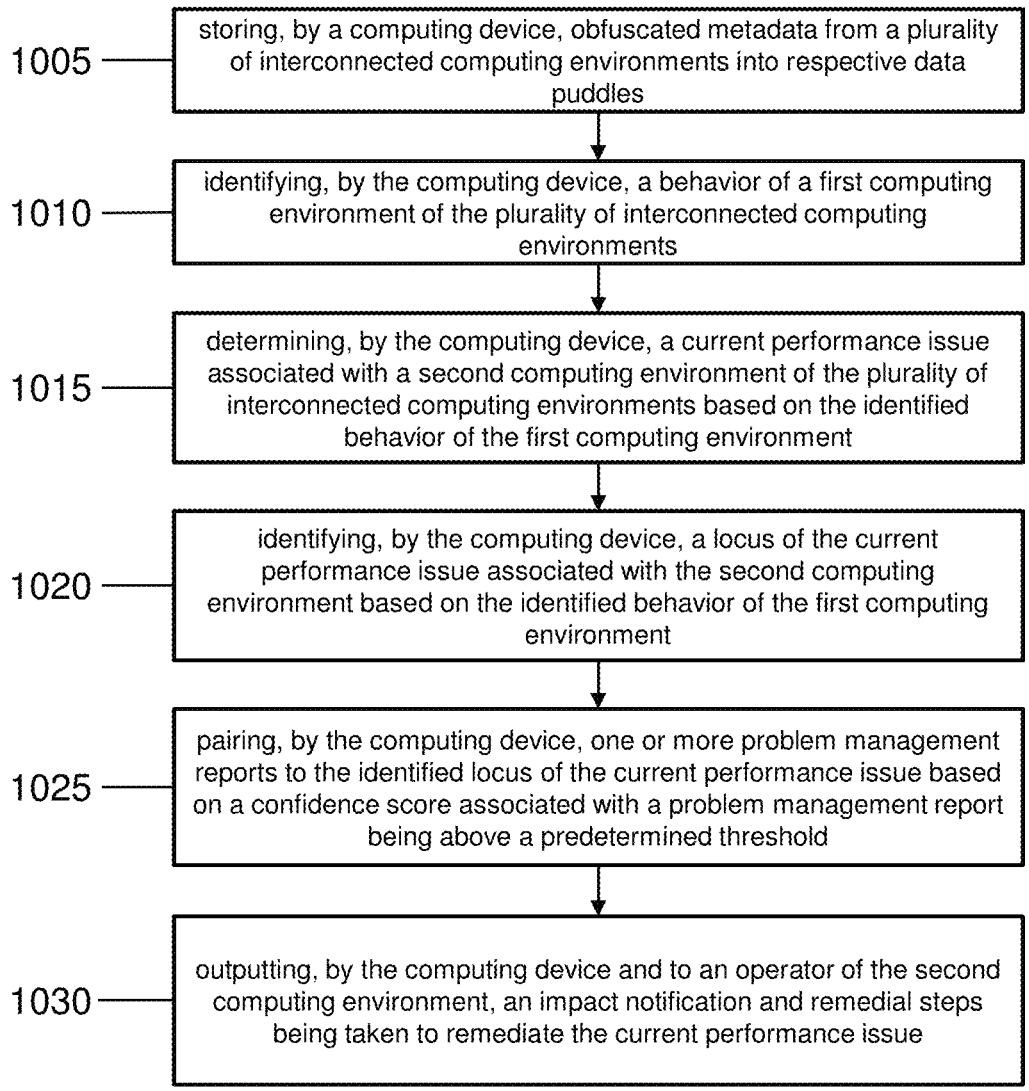
FIG. 10 shows a flowchart of an exemplary method in accordance with aspects of the invention.

FIG. 10 shows a flowchart of an exemplary method in accordance with aspects of the present invention. Steps of the method may be carried out in the environment of FIG. 4 and are described with reference to elements depicted in FIGS. 4 and 7.

At step 1005, the method stores, by a computing device, obfuscated metadata from a plurality of interconnected computing environments into respective data puddles. In embodiments, and as described with respect to FIG. 7, front-end portion 630A of adaptive resiliency modeler 630 stores in central data repository system 720 obfuscated metadata from company A 310, company B 320, company C 330, and company D 340 into respective data puddles.

At step 1010, the method identifies, by the computing device, a behavior of a first computing environment of the plurality of interconnected computing environments. In embodiments, and as described with respect to FIG. 7, front-end portion 630A of adaptive resiliency modeler 630 identifies a behavior of company A 310.

At step 1015, the method determines, by the computing device, a current performance issue associated with a second computing environment of the plurality of interconnected computing environments based on the identified behavior of the first computing environment. In embodiments, and as described with respect to FIG. 7, second portion 630B of adaptive resiliency modeler 630 determines a current performance issue associated with company C 330 based on the identified behavior of company A 310.

At step 1020, the method identifies, by the computing device, a locus of the current performance issue associated with the second computing environment based on the identified behavior of the first computing environment. In embodiments, and as described with respect to FIG. 7, second portion 630B of adaptive resiliency modeler 630 identifies the locus of the current performance issue associated with company C 330 as company C 330 based on the identified behavior of company A 310.

At step 1025, the method pairs one or more problem management reports to the identified locus of the current performance issue based on a confidence score associated with a problem management report being above a predetermined threshold. In embodiments, and as described with respect to FIG. 7, second portion 630B of adaptive resiliency modeler 630 pairs system problem reports product A 730 to the identified locus of the current performance issue based on a confidence score associated with system problem reports product A 730 being above a predetermined threshold.

At step 1030, the method outputs, by the computing device and to an operator of the second computing environment, an impact notification and remedial steps to be taken to remediate the current performance issue. In embodiments, and as described with respect to FIG. 7, second portion 630B of adaptive resiliency modeler 630 outputs to company C 330 an impact notification notifying company C 330 of the current performance issue, and outputs to company C 330 remedial steps being taken at company A 310 to remediate the expected future performance issue.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
obfuscating, by a computing device, metadata from a plurality of interconnected computing environments by encrypting the metadata and removing unencrypted data identification which includes a source of the metadata;
storing, by the computing device, the obfuscated metadata from the plurality of interconnected computing environments into respective data puddles;
identifying, by the computing device, a behavior of a first computing environment of the plurality of interconnected computing environments based on the respective data puddles;
determining, by the computing device, an expected future performance issue associated with a second computing environment of the plurality of interconnected computing environments using an artificial intelligence (AI) application which is trained on a plurality of trouble tickets from the plurality of interconnected computing environments, a plurality of health problems, and a plurality of performance problems, wherein the determined expected future performance issue associated with the second computing environment of the plurality of interconnected environments is based on the trained AI application identifying a problem of the identified behavior of the first computing environment using the plurality of trouble tickets from the plurality of interconnected computing environments;
identifying, by the computing device, a locus of the expected future performance issue associated with the second computing environment based on the identified behavior of the first computing environment; and
outputting, by the computing device and to an operator of the second computing environment, an impact notification and remedial steps being taken to prevent the expected future performance issue.

2. The method of claim 1, further comprising coordinating, by the computing device, timestamps in the metadata from the plurality of interconnected computing environments,
wherein the behavior is an application behavior.

3. The method of claim 1, wherein the storing the obfuscated metadata from a plurality of interconnected computing environments into the respective data puddles further comprises:
identifying patterns of the obfuscated metadata; and
storing the obfuscated metadata in the respective data puddles corresponding to the identified patterns of the obfuscated metadata,
wherein the behavior is a system behavior.

4. The method of claim 1, wherein the identifying the behavior of the first computing environment is based on analyzing a first data puddle of the data puddles, the first data puddle being associated with the first computing environment.

5. The method of claim 1, further comprising identifying, by the computing device, an application pattern of the first computing environment.

6. The method of claim 1, further comprising identifying, by the computing device, a system pattern of the first computing environment.

7. The method of claim 1, further comprising pairing, by the computing device, one or more problem management reports to the identified locus of the expected future performance issue based on a confidence score associated with a problem management report being above a predetermined threshold.

8. The method of claim 1, wherein the first computing environment operates using a first operating system and the second computing environment operates using a second operating system, the first operating system and the second operating system being different operating systems.

9. A method, comprising:
obfuscating, by a computing device, metadata from a plurality of interconnected computing environments by encrypting the metadata and removing unencrypted data identification which includes a source of the metadata;
storing, by the computing device, the obfuscated metadata from the plurality of interconnected computing environments into respective data puddles;
identifying, by the computing device, a pattern of a first computing environment of the plurality of interconnected computing environments based on the respective data puddles;
determining, by the computing device, an expected future performance issue associated with a second computing environment of the plurality of interconnected computing environments using an artificial intelligence (AI) application which is trained on a plurality of trouble tickets from the plurality of interconnected computing environments, a plurality of health problems, and a plurality of performance problems, wherein the determined expected future performance issue associated with the second computing environment of the plurality of interconnected computing environments is based on the trained AI application identifying a problem of the identified pattern of the first computing environment using the plurality of trouble tickets from the plurality of interconnected computing environments;
identifying, by the computing device, a locus of the expected future performance issue associated with the second computing environment based on the identified pattern of the first computing environment; and
outputting, by the computing device and to an operator of the second computing environment, an impact notification and remedial steps being taken to prevent the expected future performance issue.

10. The method of claim 9, further comprising coordinating, by the computing device, timestamps in the metadata from the plurality of interconnected computing environments,
wherein the pattern is an application pattern.

11. The method of claim 9, wherein the storing the obfuscated metadata from a plurality of interconnected computing environments into the respective data puddles further comprises:
identifying patterns of the obfuscated metadata; and
storing the obfuscated metadata in the respective data puddles corresponding to the identified patterns of the obfuscated metadata,
wherein the pattern is a system pattern.

12. The method of claim 9, wherein the identifying the pattern of the first computing environment is based on analyzing a first data puddle of the data puddles, the first data puddle being associated with the first computing environment.

13. The method of claim 9, further comprising pairing, by the computing device, one or more problem management reports to the identified locus of the expected future performance issue based on a confidence score associated with a problem management report being above a predetermined threshold.

14. The method of claim 9, further comprising retrieving, by the computing device, the obfuscated metadata from the plurality of interconnected computing environments.

15. A method, comprising:
obfuscating, by a computing device, metadata from a plurality of interconnected computing environments by encrypting the metadata and removing unencrypted data identification which includes a source of the metadata;
storing, by the computing device, the obfuscated metadata from the plurality of interconnected computing environments into respective data puddles;
identifying, by the computing device, a behavior of a first computing environment of the plurality of interconnected computing environments based on the respective data puddles;
determining, by the computing device, a current performance issue associated with a second computing environment of the plurality of interconnected computing environments using an artificial intelligence (AI) application which is trained on a plurality of trouble tickets from the plurality of interconnected computing environments, a plurality of health problems, and a plurality of performance problems, wherein the determined current performance issue associated with the second computing environment of plurality of interconnected computing environments is based on the trained AI application identifying a problem of the identified behavior of the first computing environment using the plurality of trouble tickets from the plurality of interconnected computing environments;
identifying, by the computing device, a locus of the current performance issue associated with the second computing environment based on the identified behavior of the first computing environment; and
outputting, by the computing device and to an operator of the second computing environment, an impact notification and remedial steps being taken to remediate the current performance issue.

16. The method of claim 15, further comprising;
coordinating, by the computing device, timestamps in the metadata from the plurality of interconnected computing environments; and
pairing, by the computing device, one or more problem management reports to the identified locus of the current performance issue based on a confidence score associated with a problem management report being above a predetermined threshold.

17. The method of claim 15, wherein the storing the obfuscated metadata from a plurality of interconnected computing environments into the respective data puddles further comprises:
identifying patterns of the obfuscated metadata; and
storing the obfuscated metadata in the respective data puddles corresponding to the identified patterns of the obfuscated metadata,
wherein the current performance issue is associated with a computer application running in the second computing environment and the identified behavior of the first computing environment is associated with a computer application running in the first computing environment, the first computer application and the second computer application being different computer applications.

18. A computer program product comprising one or more computer readable storage media having program instructions collectively stored on the one or more computer readable storage media, the program instructions executable to:
obfuscate metadata from a plurality of interconnected computing environments by encrypting the metadata and removing unencrypted data identification which included a source of the metadata;
store the obfuscated metadata from the plurality of interconnected computing environments into respective data puddles;
identify a behavior of a first computing environment of the plurality of interconnected computing environments based on the respective data puddles;
determine an expected future performance issue associated with a second computing environment of the plurality of interconnected computing environments using an artificial intelligence (AI) application which is trained on a plurality of trouble tickets from the plurality of interconnected computing environments, a plurality of health problems, and a plurality of performance problems, wherein the determined expected future performance issued associated with the second computing environment of the plurality of interconnected computing environments is based on the trained AI application identifying a problem of the identified behavior of the first computing environment using the plurality of trouble tickets from the plurality of interconnected computing environments;
identify a locus of the expected future performance issue associated with the second computing environment based on the identified behavior of the first computing environment; and
output, to an operator of the second computing environment, an impact notification and remedial steps being taken to prevent the expected future performance issue.

19. The computer program product of claim 18, further comprising program instructions executable to coordinate timestamps in the metadata from the plurality of interconnected computing environments,
wherein the identifying the behavior of the first computing environment is based on analyzing a first data puddle of the data puddles, the first data puddle being associated with the first computing environment.

20. The computer program product of claim 18, further comprising program instructions executable to pair one or more problem management reports to the identified locus of the current performance issue based on a confidence score associated with a problem management report being above a predetermined threshold,
wherein the storing the obfuscated metadata from a plurality of interconnected computing environments into the respective data puddles further comprises:
identifying patterns of the obfuscated metadata; and
storing the obfuscated metadata in the respective data puddles corresponding to the identified patterns of the obfuscated metadata.

21. The computer program product of claim 18, wherein the obfuscated metadata is stored in a central data repository system.

22. The computer program product of claim 18, wherein each of the data puddles is isolated from each of the other of the data puddles.

23. A system comprising:
a processor, a computer readable memory, one or more computer readable storage media, and program instructions collectively stored on the one or more computer readable storage media, the program instructions executable to:
obfuscate metadata from a plurality of interconnected computing environments by encrypting the metadata and removing unencrypted data identification which includes a source of the metadata;
store the obfuscated metadata from the plurality of interconnected computing environments into respective data puddles;
identify a behavior of a first computing environment of the plurality of interconnected computing environments based on the respective data puddles;
determine an expected future performance issue associated with a second computing environment of the plurality of interconnected computing environments using an artificial intelligence (AI) application which is trained on a plurality of trouble tickets from the plurality of interconnected computing environments, a plurality of health problems, and a plurality of performance problems, wherein the determined expected future performance issue associated with the second computing environment of the plurality of interconnected computing environments is based on the trained AI application identifying a problem of the identified behavior of the first computing environment using the plurality of trouble tickets from the plurality of interconnected computing environments;
identify a locus of the expected future performance issue associated with the second computing environment based on the identified behavior of the first computing environment; and
output, to an operator of the second computing environment, an impact notification and remedial steps being taken to prevent the expected future performance issue.

24. The system of claim 23, further comprising program instructions to coordinate timestamps in the metadata from the plurality of interconnected computing environments,
wherein the identifying the behavior of the first computing environment is based on analyzing a first data puddle of the data puddles, the first data puddle being associated with the first computing environment, and the AI application comprises multi-layered neural networks.

25. The system of claim 23, further comprising another AI application which ingests logs streamed from each cohort entity, identifies patterns, anti-patterns and changes to the patterns and anti-patterns, and identifies members of cohort groups and changes to the cohort groups, wherein the expected future performance issue is associated with a computer application running in the second computing environment and the identified behavior of the first computing environment is associated with a computer application running in the first computing environment, the first computer application and the second computer application being different computer applications,
wherein the storing the obfuscated metadata from a plurality of interconnected computing environments into the respective data puddles further comprises:
identifying patterns of the obfuscated metadata; and
storing the obfuscated metadata in the respective data puddles corresponding to the identified patterns of the obfuscated metadata.

\* \* \* \* \*